United States Patent
Luo et al.

(10) Patent No.: US 12,228,710 B1
(45) Date of Patent: Feb. 18, 2025

(54) ULTRA-WIDE ANGLE BROADBAND POLARIZATION IMAGING SYSTEM BASED ON METASURFACE, AND DETECTION APPARATUS

(71) Applicant: THE INSTITUTE OF OPTICS AND ELECTRONICS, THE CHINESE ACADEMY OF SCIENCES, Sichuan (CN)

(72) Inventors: Xiangang Luo, Sichuan (CN); Mingbo Pu, Sichuan (CN); Ting Xie, Sichuan (CN); Fei Zhang, Sichuan (CN); Xiaoliang Ma, Sichuan (CN)

(73) Assignee: THE INSTITUTE OF OPTICS AND ELECTRONICS, THE CHINESE ACADEMY OF SCIENCES, Sichuan (CN)

( * ) Notice: Subject to any disclaimer, the term of this patent is extended or adjusted under 35 U.S.C. 154(b) by 0 days.

(21) Appl. No.: 18/719,222

(22) PCT Filed: Nov. 16, 2022

(86) PCT No.: PCT/CN2022/132186
§ 371 (c)(1),
(2) Date: Jun. 12, 2024

(87) PCT Pub. No.: WO2023/109412
PCT Pub. Date: Jun. 22, 2023

(30) Foreign Application Priority Data

Dec. 13, 2021 (CN) .......................... 202111518469.0

(51) Int. Cl.
*G02B 13/06* (2006.01)
*G01J 3/02* (2006.01)
(Continued)

(52) U.S. Cl.
CPC ............ *G02B 13/06* (2013.01); *G01J 3/0208* (2013.01); *G01J 3/0224* (2013.01); *G01J 3/447* (2013.01); *G02B 1/002* (2013.01); *G02B 13/14* (2013.01)

(58) Field of Classification Search
None
See application file for complete search history.

(56) References Cited

U.S. PATENT DOCUMENTS 10,338,275 B1 * 7/2019 Acosta ................... G02B 1/002
10,948,801 B1 * 3/2021 Lu ....................... G02B 27/0172
(Continued)

FOREIGN PATENT DOCUMENTS

CN        101006366 A       7/2007
CN        102384793 A       3/2012
(Continued)

OTHER PUBLICATIONS

International Search Report of PCT/CN2022/132186, mailed Feb. 14, 2023; English translation.

*Primary Examiner* — Marcus H Taningco
*Assistant Examiner* — Djura Malevic
(74) *Attorney, Agent, or Firm* — DICKINSON WRIGHT PLLC

(57) ABSTRACT

An ultra-wide angle broadband polarization imaging system based on a metasurface, and a detection apparatus, the imaging system comprising a first lens (L1) having negative optical power, a linear polarizer (P1), a quarter wave plate (P2), a diaphragm (STO), a second lens (L2) having positive optical power, a third lens (L3) having positive optical power, and the metasurface (M), wherein an object side surface and an image side surface of the lens are planar or spherical; and the phase distribution required for the system
(Continued)

in a broadband spectrum band is achieved by setting different rotation angles θ of a unit structure of the metasurface.

9 Claims, 6 Drawing Sheets

(51) Int. Cl.
  *G01J 3/447* (2006.01)
  *G02B 1/00* (2006.01)
  *G02B 13/14* (2006.01)

(56) References Cited

U.S. PATENT DOCUMENTS

| | | | |
|---|---|---|---|
| 11,371,888 B2* | 6/2022 | Pau | G01J 5/59 |
| 11,630,238 B2* | 4/2023 | Mun | G02B 3/00 |
| | | | 348/335 |
| 11,640,040 B2* | 5/2023 | Colburn | G02B 7/10 |
| | | | 359/676 |
| 11,822,106 B2* | 11/2023 | Han | G02B 5/1871 |
| 11,835,680 B2* | 12/2023 | Groever | G02B 1/002 |
| 11,885,943 B2* | 1/2024 | Park | G02B 5/1871 |
| 11,906,698 B2* | 2/2024 | Yu | G02B 27/0037 |
| 12,066,592 B2* | 8/2024 | Park | G02B 5/189 |
| 12,066,696 B2* | 8/2024 | Park | G02F 1/0121 |
| 12,078,780 B2* | 9/2024 | Kim | G02B 27/0025 |
| 2012/0250165 A1* | 10/2012 | Do | G02B 13/18 |
| | | | 359/715 |
| 2013/0229704 A1* | 9/2013 | Smolyaninov | G02B 1/002 |
| | | | 359/356 |
| 2014/0044392 A1* | 2/2014 | Fattal | G02B 6/12002 |
| | | | 385/37 |
| 2016/0320531 A1* | 11/2016 | Kamali | G02B 1/002 |
| 2017/0212285 A1* | 7/2017 | Arbabi | G02B 1/002 |
| 2018/0180486 A1* | 6/2018 | Pau | H04N 5/33 |
| 2018/0216797 A1* | 8/2018 | Khorasaninejad | B82Y 40/00 |
| 2019/0064489 A1* | 2/2019 | Tanaka | G02B 15/145119 |
| 2019/0113727 A1* | 4/2019 | Tamma | H01L 33/58 |
| 2019/0137793 A1* | 5/2019 | Luo | G02F 1/0126 |
| 2020/0003626 A1* | 1/2020 | Pau | G02B 5/201 |
| 2020/0166783 A1* | 5/2020 | Roy | G02F 1/0102 |
| 2020/0174163 A1* | 6/2020 | Han | G02B 1/002 |
| 2020/0225386 A1* | 7/2020 | Tsai | G02B 1/002 |
| 2020/0401051 A1* | 12/2020 | Li | G03F 7/0041 |
| 2021/0103075 A1* | 4/2021 | Park | G02B 5/126 |
| 2021/0132256 A1* | 5/2021 | Park | G02B 27/0025 |
| 2021/0149081 A1* | 5/2021 | Groever | G02B 5/1842 |
| 2021/0271000 A1* | 9/2021 | Park | G02B 5/1876 |
| 2023/0125258 A1* | 4/2023 | Connor | G02F 1/19 |
| | | | 359/263 |
| 2024/0387448 A1* | 11/2024 | Machuca | H01L 21/67259 |
| 2024/0402504 A1* | 12/2024 | Connor | G02C 5/146 |

FOREIGN PATENT DOCUMENTS

| | | |
|---|---|---|
| CN | 102687054 A | 9/2012 |
| CN | 105929520 A | 9/2016 |
| CN | 107565352 A | 1/2018 |
| CN | 108037577 A | 5/2018 |
| CN | 108241208 A | 7/2018 |
| CN | 108646427 A | 10/2018 |
| CN | 110196462 A | 9/2019 |
| CN | 111338156 A | 6/2020 |
| CN | 111366991 A | 7/2020 |
| CN | 111722392 A | 9/2020 |
| CN | 112130338 A | 12/2020 |
| CN | 112379469 A | 2/2021 |
| CN | 112394429 A | 2/2021 |
| CN | 112748521 A | 5/2021 |
| CN | 112859304 A | 5/2021 |
| CN | 112965224 A | 6/2021 |
| CN | 112987018 A | 6/2021 |
| CN | 113193349 A | 7/2021 |
| CN | 114217413 A | 3/2022 |
| EP | 3205972 A1 | 8/2017 |
| TW | 1716071 B | 1/2021 |

* cited by examiner

ULTRA-WIDE ANGLE BROADBAND POLARIZATION IMAGING SYSTEM BASED ON METASURFACE, AND DETECTION APPARATUS

CROSS-REFERENCE TO RELATED APPLICATIONS

This application is a 35 U.S.C. § 371 national phase of PCT International Application No. PCT/CN2022/132186, filed Nov. 16, 2022, which claims the benefit of priority under 35 U.S.C. § 119 to Chinese Patent Application No. 202111518469.0, filed on Dec. 13, 2021, the contents of which are incorporated by reference herein in entirety.

TECHNICAL FIELD

The present disclosure relates to optical imaging systems, and particularly to a metasurface-based ultra-wide-angle broadband polarization imaging system and a detection apparatus.

BACKGROUND ART

With the progress of science and technologies theory and processing, the optical imaging systems have also made substantial development. However, the conventional optical systems generally have the problems of complex system structure and large volume and mass when realizing near-infrared wide-angle imaging, and meanwhile can hardly realize a quite large imaging field of view. In conventional optical system designs, generally an aspherical surface is used and a diffractive optical element is introduced to expand the field of view and bandwidth, and improve the imaging quality, but the aspherical surface and the diffractive optical element are difficult to process. Meanwhile, the conventional diffractive optical elements have a limited bandwidth in the near-infrared wave band and low efficiency, and cannot realize near-infrared ultra-wide-angle broadband imaging, while near-infrared-wave-band devices, different from visible-light-wave-band devices, can operate in both day and night environments, and are in great demand in practical application. Metasurface, a planar optical element composed of subwavelength structures, is ultra-light and ultra-thin, and can realize many functions that the conventional optical elements cannot achieve, and thus it is rapidly developed in the past two decades. The use of metasurface alone can realize imaging in a large field of view, but due to its large chromatic dispersion, a good imaging performance cannot be maintained under broadband conditions.

By combining the metasurface and a refractive optical element, their respective limitations can be addressed to some extent. However, such existing devices have a limited working bandwidth, and still fail to realize the ultra-wide-angle broadband polarization imaging in the near-infrared wave band. Meanwhile, since most combination systems of the metasurface and the refractive optical element cannot be directly applied to outdoor environments to acquire polarization information on a target, and can only acquire partial polarization information on the target under certain laboratory conditions. Therefore, such systems currently mainly faces the problem of further practicality.

SUMMARY

In order to solve the above problems, an objective of the present disclosure is to provide a metasurface-based ultra-wide-angle broadband polarization imaging system and a detection apparatus, to realize ultra-wide-angle imaging in a broadband wave and acquire polarization information on a target. A polarizer combination in this system can realize remote dynamic polarization imaging through motor driving and a wireless regulatory module, and has an important application prospect in the field of monitoring of security and protection and the like. Meanwhile, an imaging part of the system only consists of three refractive lenses and a metasurface, without aspherical surface, and thus the processing difficulty is relatively low. Moreover, this system is small in volume, light in weight, easy to integrate into other devices, and easy to be mounted on a flight platform to perform remote-controlled polarization imaging detection at a distance of more than one kilometer.

In order to achieve the above objective, the present disclosure provides the following technical solutions.

A metasurface-based ultra-wide-angle broadband polarization imaging system is provided. The system includes, from an object side to an image side, a first lens having negative focal power, a linear polarizer, a quarter-wave plate, a diaphragm, a second lens having positive focal power, a third lens having positive focal power and a metasurface in sequence, wherein object side surfaces and image side surfaces of the first lens, the second lens and the third lens are planar or spherical surfaces; and a rotation angle of a unit structure of the metasurface is θ, and by providing unit structures with different rotation angles θ, phase distribution required by the system under a broadband spectrum is realized.

Further, the linear polarizer and the quarter-wave plate are integrated, and can rotate together about an optical axis.

Further, the image side surface of the first lens is a concave surface, the image side surface of the second lens is a convex surface, and the object side surface and the image side surface of the third lens are both convex surfaces.

Further, in the system, Nd1>1.5, Nd2>1.8, Nd3>1.8, Vd1-Vd2>17, and Vd1-Vd3>17, where Nd1 is a refractive index of the first lens, Nd2 is a refractive index of the second lens, Nd3 is a refractive index of the third lens, Vd1 is a dispersion coefficient of the first lens, Vd2 is a dispersion coefficient of the second lens, and Vd3 is a dispersion coefficient of the third lens.

Further, the imaging system satisfies 30 mm<TTL<40 mm, 1<φ×BFL<4, where TTL is a total track length of the imaging system, φ is focal power of the imaging system, and BFL is an optical back focal length of the imaging system.

Further, the quarter-wave plate used in the imaging system is of deep subwavelength structures, with a period p and $0.1\lambda_0<p<0.5\lambda_0$; a width of the unit structure is w and $0.05\lambda_0<w<0.2\lambda_0$; a height of the unit structure is h and $0.1\lambda_0<h<\lambda_0$, and an overall thickness of the component is not more than 0.5 mm. In the above, $\lambda_0$ is center wavelength.

Further, the linear polarizer also may be of deep subwavelength structures, and a unit structure thereof has a period range of $0.08\lambda_0 \sim 0.6\lambda_0$, a width range of $0.04\lambda_0 \sim 0.08\lambda_0$, and a height range of $0.08\lambda_0 \sim 0.5\lambda_0$.

Further, in the unit structure of the metasurface, an upper dielectric nanorod has a center-to-center spacing $p_M$ in a y direction and $0.1\lambda_0<p_M<0.6\lambda_0$, a spacing in an x direction being 100 nm, a width $w_M$ and $0.1\lambda_0<w_M<0.3\lambda_0$, and a height $h_M$ and $0.3\lambda_0<h_M<0.65\lambda_0$.

Further, rotation of the linear polarizer and the quarter-wave plate is controlled by a miniature motor, and the miniature motor is remotely controlled.

The present disclosure further provides a detection apparatus, wherein the detection apparatus is mounted with the imaging system according to the above, for realizing ultra-wide-angle polarization imaging under a broadband wave band.

The present disclosure has the following beneficial effects.

In the system provided in the present disclosure, a refractive/meta hybrid system is formed, and among the lenses, there are only three spherical lenses, and other three are all planar optical elements, which is easy to assemble, does not involve complex surface types such as aspherical surface in the system, and reduces the processing difficulty to a certain degree. Moreover, this system expands the field of view and bandwidth and improves the imaging quality, and meanwhile, due to the use of the metasurface based on a geometric phase principle, avoids the problems of limited bandwidth and low efficiency suffered by systems employing the conventional diffractive optical elements. Besides, the quarter-wave plate and the metasurface in the system both may be of deep subwavelength structures, whose characteristics of light and thin reduce the volume and mass of the system, and allow integration with other devices and installation on flight equipment to realize multi-scene imaging and detection. This system can realize ultra-wide-angle polarization imaging under broadband near-infrared wave band, renders excellent imaging quality in the whole range of field of view and under the near-infrared broadband, can acquire quite rich information on an imaged target, can be used day and night, reduce environments requirements, facilitate practical application, and has a wide application prospect in the field of monitoring of security and protection and the like.

BRIEF DESCRIPTION OF DRAWINGS

In order to more clearly illustrate technical solutions in embodiments of the present disclosure, drawings that need to be used in the description of the embodiments will be briefly introduced below. Apparently, the drawings in the following description are only for some embodiments of the present disclosure, and those ordinarily skilled in the art still could obtain other drawings in light of these drawings, without using any inventive efforts.

ILLUSTRATION OF REFERENCE SIGNS

Figure 1:
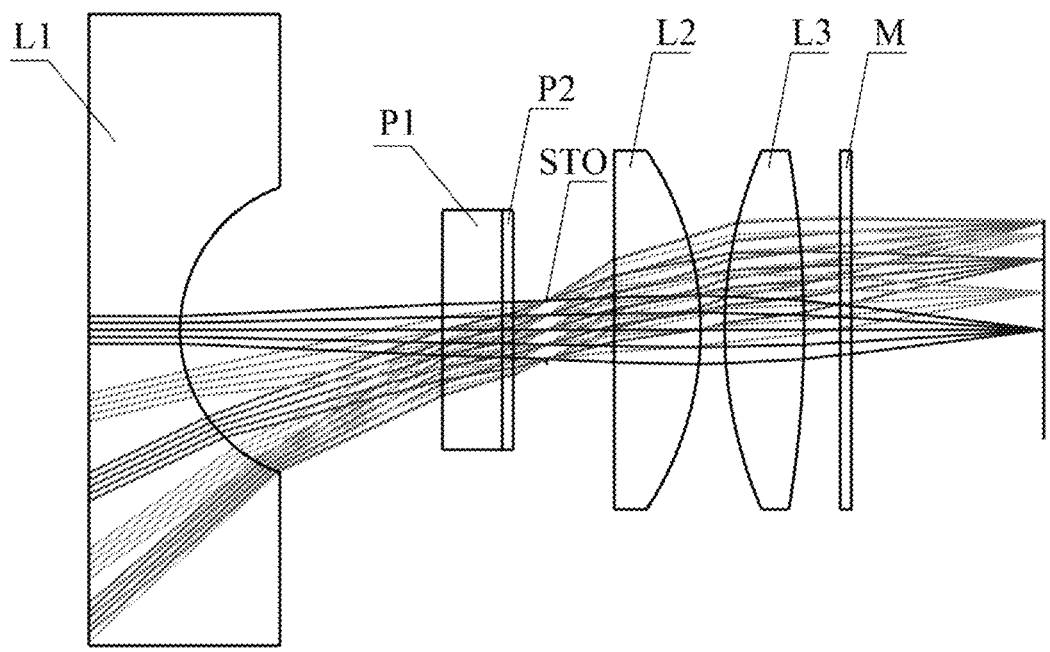
FIG. 1 is a diagram of an optical system according to embodiments of the present disclosure.

L1—first lens, P1—linear polarizer, P2—quarter-wave plate, STO—diaphragm, L2—second lens, L3—third lens, M—metasurface.

DETAILED DESCRIPTION OF EMBODIMENTS

In order to make the objectives, technical solutions and advantages of the present disclosure more clear and explicit, the present disclosure is further described in detail below in conjunction with embodiments with reference to drawings. Apparently, some but not all embodiments of the present disclosure are described. Based on the embodiments in the present disclosure, all of other embodiments obtained by those ordinarily skilled in the art without using any inventive efforts shall fall within the scope of protection of the present disclosure.

The terms used in the present disclosure are merely for the purpose of describing the embodiments, and are not intended to limit the present disclosure. The terms "include", "contain" and the like used herein indicate existence of the feature, step, operation and/or component, but do not exclude existence or addition of one or more other features, steps, operations or components.

In the present disclosure, unless otherwise specified and defined explicitly, the terms such as "mount", "join", "connect", and "fix" should be construed in a broad sense. For example, it may be a fixed connection, a detachable connection, or an integral connection; it may be a mechanical connection, an electrical connection or communication with each other; it may be a direct connection, an indirect connection through an intermediary, or inner communication between two elements or interaction between two elements. For those ordinarily skilled in the art, specific meanings of the above terms in the present disclosure could be understood according to specific circumstances.

In the description of the present disclosure, it should be understood that orientation or positional relations indicated by terms such as "longitudinal", "length", "circumferential", "front", "rear", "left", "right", "top", "bottom", "inner", and "outer" are based on orientation or positional relations as shown in the drawings, merely for facilitating the description of the present disclosure and simplifying the description, rather than indicating or implying that related subsystem or element have to be in the specific orientation or be configured and operated in a specific orientation, and thus should not be construed as limitation to the present disclosure.

Throughout the drawings, like elements are denoted by like or similar reference signs. When an understanding of the present disclosure may be confused, a conventional structure or configuration will be omitted. Moreover, shapes, sizes, and positional relations of various components in the drawings do not reflect real sizes, scales or actual positional relations. In addition, in the claims, any reference signs located within parentheses shall not be construed as limitation to the claims.

Similarly, in order to simplify the present disclosure and aid in understanding one or more of various disclosed aspects, in the above description of exemplary embodiments of the present disclosure, various features of the present disclosure are sometimes grouped together in a single embodiment, drawing or description thereof. Description with reference to the terms such as "one embodiment", "some embodiments", "example", "specific example" or "some examples" indicate that specific features, structures, materials or characteristics described in combination with this embodiment or example are included in at least one embodiment or example of the present disclosure. In the present description, exemplary expressions of the above terms do not necessarily refer to the same embodiment or example. Moreover, specific features, structures, materials or characteristics described can be combined in any appropriate manner in any one or more embodiments or examples.

In addition, the terms "first" and "second" are used for descriptive purpose only, but should not be construed as indication or implication of importance in the relativity or implicit indication of the number of referred technical features. Thus, for a feature defined with the terms "first" and "second", one or more such features may be explicitly or implicitly included. In the description of the present disclosure, the meaning of the term "multiple (a plurality of)" indicates at least two, e.g. two or three, unless otherwise expressly defined.

In the present embodiment, main design parameters of an imaging system are shown in the following table:

TABLE 1

| Design Parameter | Value |
| --- | --- |
| Operating Wave Band | 900-1700 nm |
| Field of View | 178° |
| System Focal Length F | 4.596 mm |
| Image Side F# | 4 |
| Total Track Length | 39.761 mm |

The operating wave band of the system can further be widened to 2000 nm and a wider spectrum through optimization on a metasurface structure. In the present embodiment, for ease of description, a main response wave band 900-1700 nm of a near-infrared detector is chosen for description.

In the present embodiment, when an operating bandwidth is the near-infrared wave band 900-1700 nm, an operating field of view may reach 178°, and in this case, the system satisfies 30 mm<TTL<40 mm, 1<φ×BFL<4, where TTL is a total track length of the system, Y is focal power of the system, and BFL is an optical back focal length of the system. It should be noted that for different wave band ranges, ranges of the TTL, φ and BFL of the system need to be redesigned. As shown in FIG. 1, from an object side to an image side, a first lens L1 having negative focal power, a linear polarizer P1, a quarter-wave plate P2, a diaphragm STO, a second lens L2 having positive focal power, a third lens L3 having positive focal power and a metasurface M are included in sequence.

In the present embodiment, Nd1>1.5, Nd2>1.8, Nd3>1.8, Vd1-Vd2>17, and Vd1-Vd3>17, where Nd1 is a refractive index of the first lens, Nd2 is a refractive index of the second lens, Nd3 is a refractive index of the third lens, Vd1 is a dispersion coefficient of the first lens, Vd2 is a dispersion coefficient of the second lens, and Vd3 is a dispersion coefficient of the third lens.

The first plane-concave lens L1 has the negative focal power, the second plane-convex lens L2 has the positive focal power, and the third biconvex lens L3 has the positive focal power. Object side surfaces and image side surfaces of the first lens, the second lens and the third lens are planar or spherical surfaces, only the three spherical lenses are involved in the whole system, and others are all planar optical elements, which facilitates batch processing and has a low assembling and integration difficulty. By combining the refractive lenses having the focal power and the metasurface, a refractive/meta hybrid system is formed, and broadband ultra-wide-angle imaging is realized. In the present embodiment, for convenience of illustration in the drawings, the first lens L1 is a plane-concave lens, the second lens L2 is a plane-convex lens, and the third lens L3 is a biconvex lens. The three spherical lenses are not limited in specific shape, and those skilled in the art could make a choice as required. In addition, in the present embodiment, in order to improve light transmittance, all of the three spherical lenses in the system achieve 98% transmittance by double-sided coating, and all of the linear polarizer, the quarter-wave plate and the metasurface structure are improved in transmittance by coating and reduced in reflectivity. The above components may also be of a non-coating type, which could be selected by those skilled in the art as required and is not limited herein.

In the present embodiment, parameters of system elements are as follows. Numbers marked in Surface are gradually increased in an order from the object side to the image side (from S1 to S13):

TABLE 2

| Surface | Name | Radius of Curvature (mm) | Spacing or Thickness (mm) | Refractive Index Nd | Abbe Number Vd | Semi-diameter (mm) |
| --- | --- | --- | --- | --- | --- | --- |
| S1 | First lens | Infinite | 3.8 | 1.517 | 64.199 | 13.2 |
| S2 | L1 | 6.372 | 10.918 | | | 5.974 |
| S3 | Linear polarizer P1 | Infinite | 2.5 | 1.458 | 67.821 | 5 |
| S4 | quarter- | Infinite | 0.45 | 1.768 | 72.237 | 5 |
| S5 | wave plate P2 | Infinite | 1.4 | | | 1.89 |
| S6 | Diaphragm STO | Infinite | 2.8 | | | 1.229 |
| S7 | Second | Infinite | 3.6 | 1.816 | 46.549 | 7.5 |
| S8 | lens L2 | −13.614 | 1 | | | 7.5 |
| S9 | Third lens | 19 | 3.3 | 1.816 | 46.549 | 7.5 |
| S10 | L3 | −45.239 | 1.5 | | | 7.5 |
| S11 | Meta- | Infinite | 0.475 | 1.768 | 72.237 | 7.5 |
| S12 | surface M | Infinite | 8.018 | | | 7.5 |
| S13 | Image surface | — | — | | | 4.589 |

It should be noted that for different of wave band ranges, the above element parameters may be specifically designed using target values such as system focal length and F #, without being bound to the above specific values. The linear polarizer P1 and the quarter-wave plate P2 may be separated or integrated with each other, which is not limited herein. In order to save space, in the present embodiment, the linear polarizer P1 and the quarter-wave plate P2 are integrated together. The linear polarizer P1 and the quarter-wave plate P2 are used for realizing polarization imaging, that is, the linear polarizer and the quarter-wave plate in the system are coaxial, and can rotate at the same speed about an optical axis, so as to convert different linearly polarized light in the light emitted, reflected or radiated by an imaged target into circularly polarized light, and by making use of the characteristic of the metasurface M being sensitive to a polarization state of incident light, and realize polarization imaging of light in different polarization states, thus acquiring polarization information on the target, and realizing the polarization imaging. In the present embodiment, polarization imaging of light in different directions may be obtained by remotely controlling rotation of the linear polarizer and the quarter-wave plate by a remote-control miniature motor, so that it may be directly used for long-distance imaging at a distance of up to 1 km, instead of being merely restricted to laboratory use, thus greatly improving the use convenience and practicality thereof. In the present embodiment, the miniature motor is chosen to regulate and control the rotation of the linear polarizer and the quarter-wave plate, but those skilled in the art could also select, according to actual use, devices that drive the linear polarizer and the quarter-wave plate to rotate, which is not limited herein.

Figure 2:
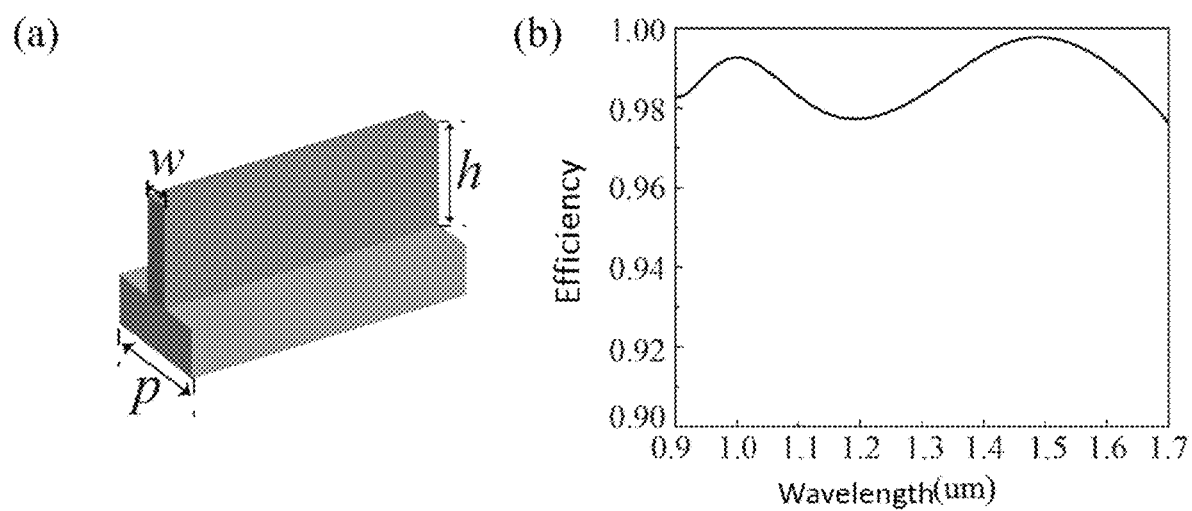
FIG. 2 shows a structural schematic diagram and a relative efficiency graph of a quarter-wave plate in a system according to embodiments of the present disclosure, wherein (a) is a schematic diagram of a subwavelength unit structure constituting the quarter-wave plate, and (b) is the efficiency graph.

The linear polarizer is used for screening out polarized light in an specific polarization direction, and the quarter-wave plate is used for converting the linearly polarized light into the circularly polarized light. They both may be of deep subwavelength structures or conventional components, which is not limited herein. In order to reduce a system length, the linear polarizer may also be the deep subwavelength structures, wherein the unit structure thereof has a period value range of $0.08\lambda_0 \sim 0 \sim 0.6\lambda_0$, a width value range of $0.04\lambda_0 \sim 0.08\lambda_0$, and a height value range of $0.08\lambda_0 \sim 0 \sim 0.5\lambda_0$. Meanwhile, the quarter-wave plate may be deep subwavelength structures, wherein a period is p and $0.1\lambda_0 < p < 0.5\lambda_0$; a unit structure width is w and $0.05\lambda_0 < w < 0.2\lambda_0$; a unit structure height is h and $0.1\lambda_0 < h < \lambda_0$, and a base thickness is not more than 0.5 mm. In the above, $\lambda_0$ is center wavelength. In the present embodiment, the quarter-wave plate P2 is of deep subwavelength structures. As shown in FIG. 2, the unit structure thereof is a strip-shaped subwavelength silicon nanorod, which has a width w of 156 nm, a period p of 264 nm, and a height h of 300 nm, and a substrate of sapphire with a thickness of 0.45 mm, and the quarter-wave plate achieves average efficiency of 98.698%. The linear polarizer P1 is of deep subwavelength structures, and a unit structure thereof is a strip-shaped subwavelength silicon nanorod, which has a width of 64 nm, a period of 153 nm, a height h of is 120 nm, and linear polarizer has the same substrate as the quarter-wave plate. Due to the use of the deep subwavelength structures, the system is small in volume and light in weight, and thus is easy to be mounted on a flight platform to realize the ultra-wide-angle broadband polarization imaging.

Meanwhile, most of the existing wide-angle imaging systems use lenses of an aspherical surface type and conventional diffractive optical elements, and are greatly restricted in efficiency, bandwidth and functional diversity. Discrete steps structure or nanorods structure of a different effective refractive index used in such system has different phase responses to different wavelengths, and thus the operating bandwidth is limited. Moreover, it is insensitive to polarization, and cannot realize polarization imaging detection. However, the metasurface M used in the present embodiment is based on a geometric phase principle: ($\Phi = \pm 2\theta$, that is, a phase generated by the metasurface is two times a rotation angle of the unit structure thereof, and only by rotating the unit structures, phase distribution required by the system under a wide spectrum can be realized. As geometric phase only depends on the rotation angle of the unit structure and is independent of the wavelength, the phase responses of the metasurface to different wavelengths are kept consistent, and thus can operate under an ultra-wide band, without being restricted by the wavelength or bandwidth. Since the geometric phase principle is used, the metasurface in the system is polarization-sensitive, polarization information on the imaged target can be acquired using this characteristic, to perform the polarization imaging detection, thus further expanding richness of information acquired by the imaging system, and being of great significance to fields such as anti-counterfeiting surveillance.

Figure 3:
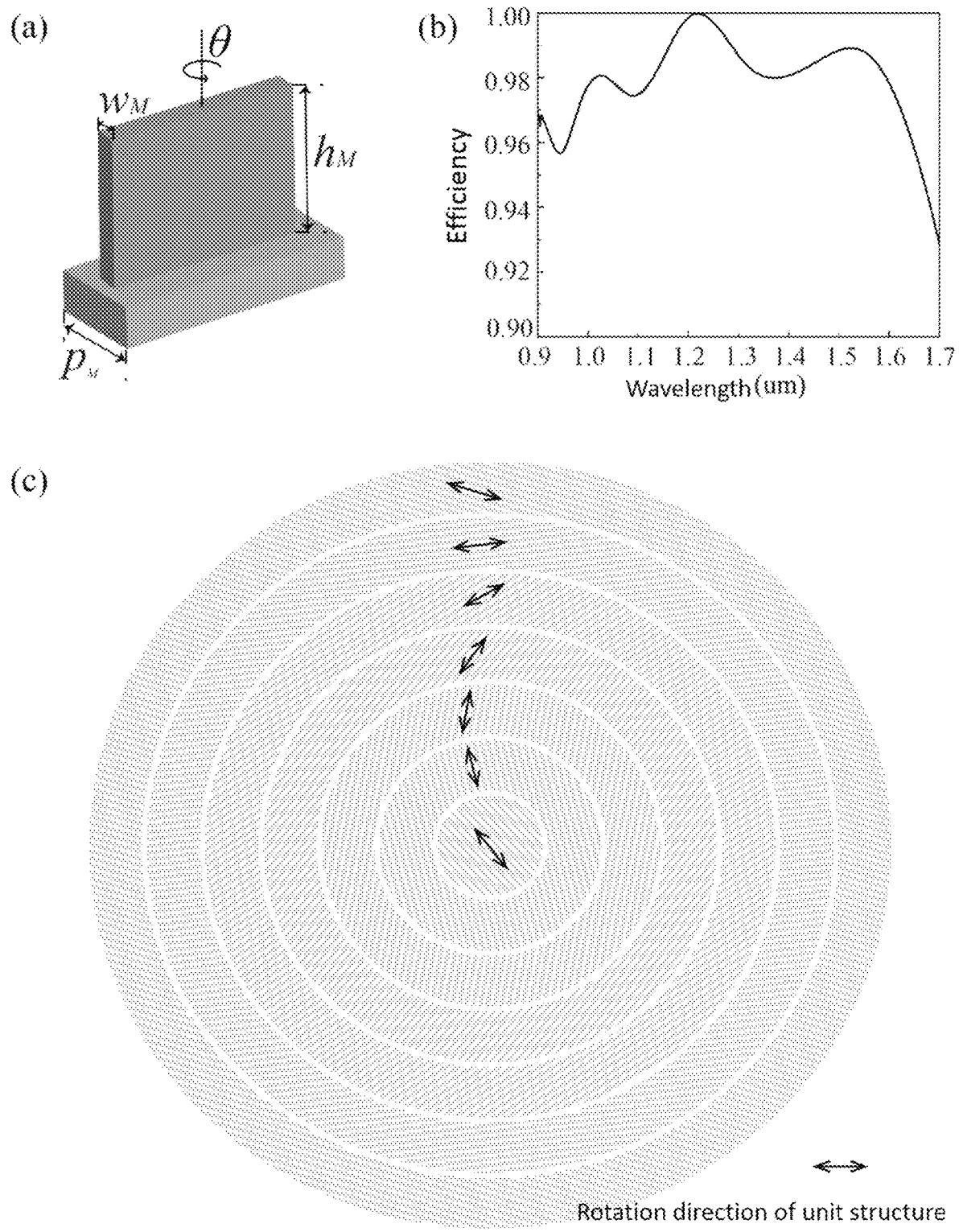
FIG. 3 shows structural schematic diagrams and a relative efficiency graph of a metasurface in a system according to embodiments of the present disclosure, wherein (a) is a schematic diagram of a subwavelength unit structure constituting the metasurface, (b) is an efficiency graph, and (c) is a structural schematic diagram of the metasurface.

In the present embodiment, the phase distribution of a surface type of a light incident surface S 11 (see Table 2) of the metasurface M satisfies the following equation:

$$\Phi = M_{order} \Sigma_{i=1}^{N} A_i \rho^{2i}$$

where $\Phi$ represents phase, $M_{order}$ is order of diffraction, N is the maximal degree of polinomial in series, $\rho$ is normalized radial aperture coordinate, $A_i$ is coefficient of the 2i-th term of $\rho$. Here, $M_{order}$ is the first order, N is 4, and a value of $\rho$ is equal to a ratio of r to R, where r is a radius value corresponding to different positions in a plane of the metasurface, a maximum value of r is actual radius of the metasurface M, R is normalized radius, and R is 1 mm herein. It should be noted that diagram (c) in FIG. 3 is only an intuitive schematic diagram, but is not a diagram representing actual structure distribution. Actual phase distribution in the present embodiment needs to meet the above formula.

In the present embodiment, the metasurface M is a binary plane 2, whose polinomial coefficient $A_i$ are shown in the following table.

TABLE 3

| Surface Type | Quadratic Term Coefficient $A_1$ | Quartic Term Coefficient $A_2$ | Six-Power Term Coefficient $A_3$ | Eight-Power Term Coefficient $A_4$ |
|---|---|---|---|---|
| Binary Plane 2 | −15.225164 | 0.0714807 | −0.0029836596 | 7.5031731e−5 |

That is, the phase distribution of the metasurface satisfies the following equation:

$$\Phi = -15.225164\rho^2 + 0.0714807\rho 4 - 0.0029836596\rho^6 + 7.5031731e^{-5}\rho^8$$

Through optimization on the subwavelength unit structures forming the metasurface, the efficiency may be greatly improved, and high-efficiency imaging with average efficiency of 97.869% can be achieved, as shown in FIG. 3. In the present embodiment, the phase distribution achieved by this surface type is achieved by the metasurface. The metasurface is composed of the deep subwavelength structures. As shown in FIG. 3, the unit structure thereof is a subwavelength silicon nanorod, of which a width $w_M$ is 166 nm, a period $p_y$ in y direction is 277 nm, a spacing between structures in x direction is 100 nm, a height $h_M$ is 600 nm, and a substrate is sapphire with a thickness of 0.475 mm, and the metasurface achieves average efficiency of 97.869%. The implementation of the phase is according to the geometric phase principle, $\Phi = \pm 2\theta$, where $\Phi$ is phase of the unit structure, $\theta$ is rotation angle of the unit structure, which is positive or negative depending on a polarization state of circularly polarized light. It can be seen therefrom that the geometric phase-based metasurface can achieve arbitrary phase distribution only by rotating the unit structures, the phase thereof is only related to the rotation angle and the polarization state, and is independent of the wavelength, and thus it can operate under an ultra-wide band, without being restricted by the wavelength or bandwidth, and can also realize the polarization imaging.

The use of the metasurface, on one hand, can well correct the chromatic aberration, and on the other hand, can reduce the complexity of the system, reduce the use of conventional lenses, improve the integration degree of the whole system, reduce the weight and volume of the system, and reduce the assembly difficulty. Meanwhile, the novel function of the metasurface can also further expand the functions of the system, such as the polarization imaging function in the embodiments.

Figure 4:
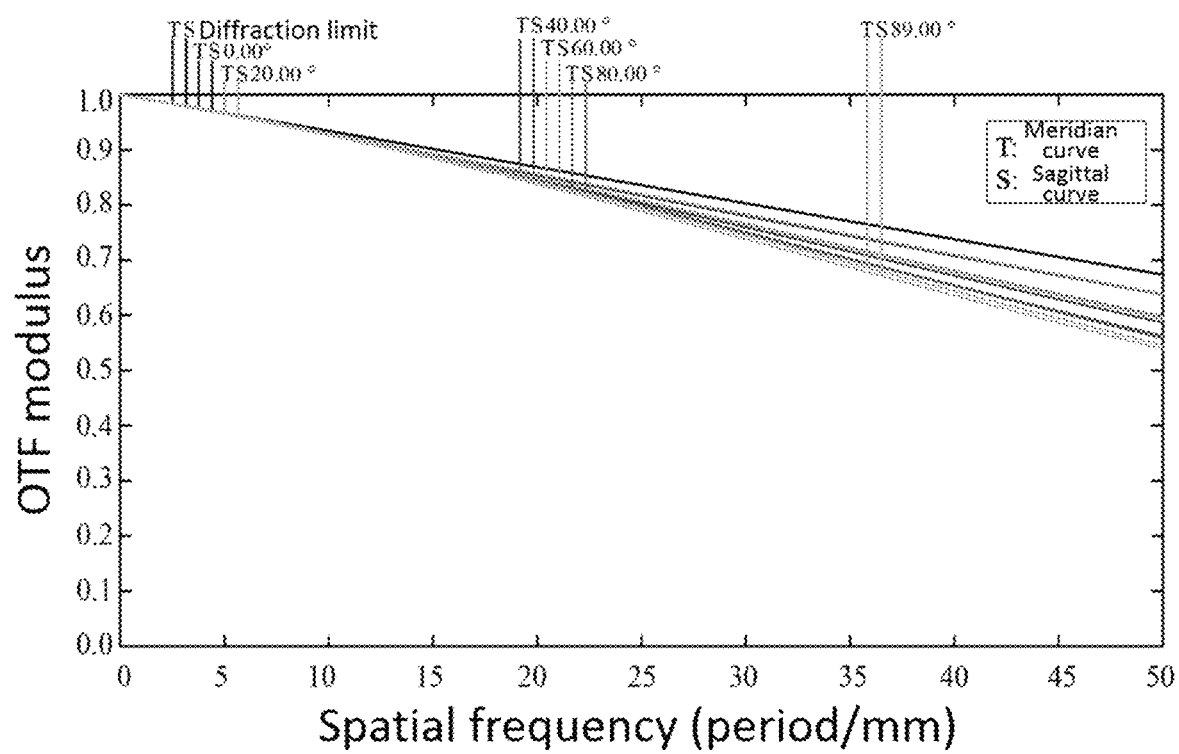
FIG. 4 is an optical transfer function graph according to embodiments of the present disclosure.

In the present embodiment, the optical transfer function graph of the system is shown in FIG. 4. It can be seen from the graph that an optical transfer function curve of the system is quite close to a diffraction limit curve, and at 50 1p/mm, an optical transfer function (OTF) modulus is still above 0.5. In optical imaging design evaluation, if the OTF modulus at a cutoff frequency is higher than 0.5, the system can be considered as having good imaging quality. In this system, if a pixel size of the detector at the spectral wave band of the operating wave band 900-1700 nm is 15 μm, the cutoff frequency of the detector is 33.3 1p/mm, and in this case, the OTF modulus of the system at this frequency is higher than 0.6. Therefore, the imaging performance of this system is good.

Figure 5:
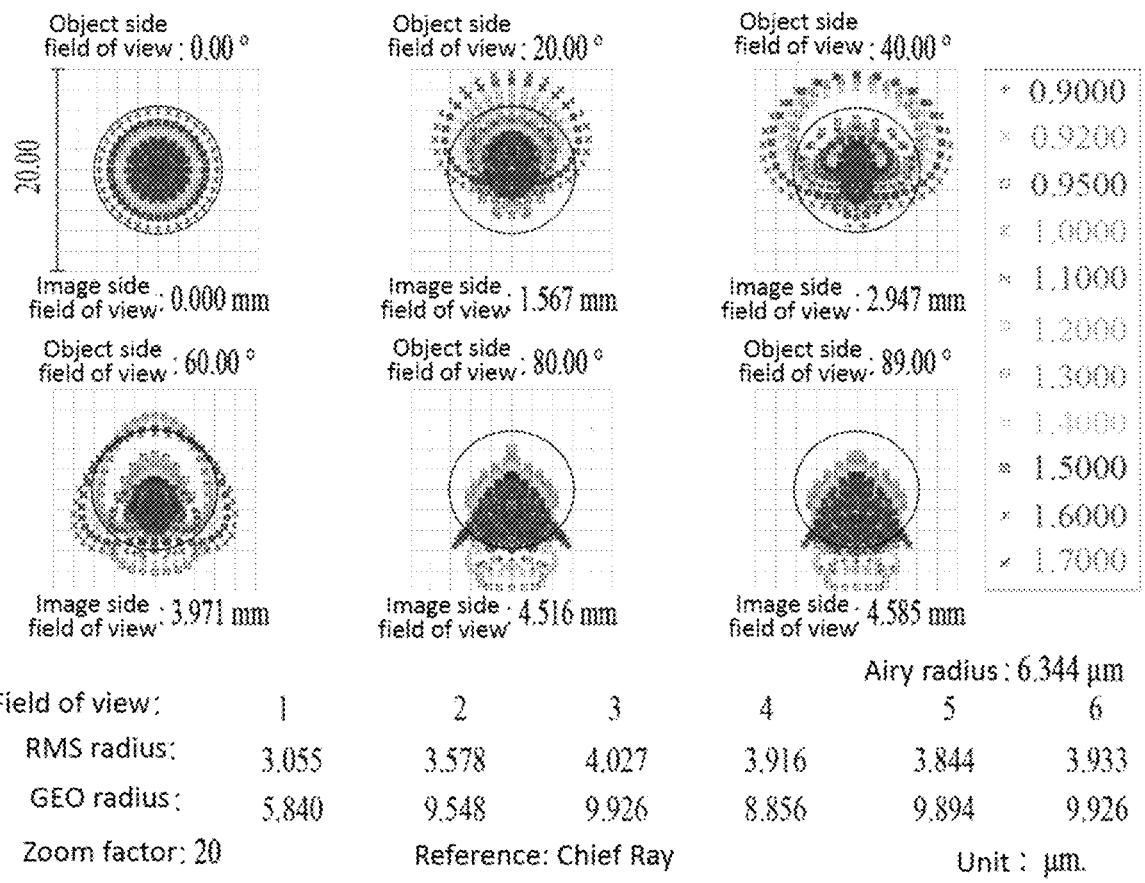
FIG. 5 shows optical spot diagrams according to embodiments of the present disclosure.

In the present embodiment, the optical spot diagrams of the system are shown in FIG. 5. The optical spot diagram is another important index for evaluating the optical imaging quality, which reflects a size of defocused spot, and when a dimension of the defocused spot is closer to Airy disk, the imaging quality of the system is higher. It can be seen from the diagrams that under various fields of view, RMS radii of defocused spots of the system are all smaller than Airy disk radius; even at the maximum half field-of-view angle of 89° C., the RMS radius is still smaller than the Airy disk radius; and GEO radii of the defocused spots are also close to the Airy disk radius; therefore, the imaging quality of the system is high.

Figure 6:
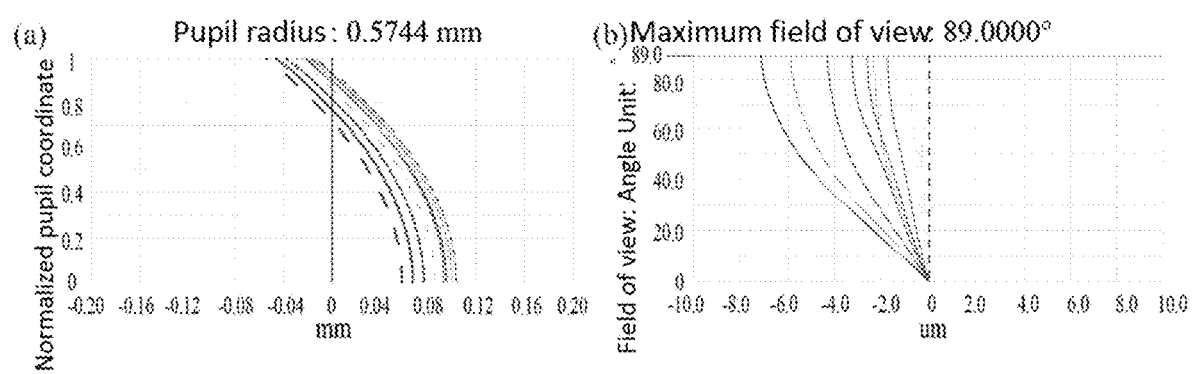
FIG. 6 shows chromatic aberration graphs according to embodiments of the present disclosure, wherein (a) is an axial chromatic aberration graph, and (b) is a lateral chromatic aberration graph.

In the present embodiment, graphs of axial chromatic aberration and lateral chromatic aberration of the system are shown in FIG. 6. The axial chromatic aberration graph shows the axial chromatic aberration of different wavelengths as a function of entrance pupil height, where ordinate represents pupil height and abscissa represents the axial chromatic aberration. It can be seen from the graph that axial chromatic aberration of various wavelengths of the system at various entrance pupil heights is less than 0.1 mm, which is less than a product (0.12 mm) of the pixel of the common detector in this spectrum and twice the F number; therefore, the axial chromatic aberration of the system is small. The lateral chromatic aberration graph shows differences of distances between various wavelengths and an intersection point between a dominant wavelength and an image plane, where ordinate represents field of view and abscissa represents the lateral chromatic aberration. It can be seen from the graph that the lateral chromatic aberration of various wavelengths of the system in various fields of view is less than 8 m, which is less than the pixel (15 μm) of the common detector in this spectrum; therefore, the lateral chromatic aberration of this system graph is small, and the performance of the system is good. In conclusion, the chromatic aberration of the system in the whole operating wave band and in the whole wide-angle field of view can be well corrected.

The above imaging system may be mounted on a detection apparatus, for realizing multi-scene imaging.

It can be seen therefrom that the metasurface-based ultra-wide-angle broadband polarization imaging system provided in the present disclosure has good imaging performance.

The above design process, embodiments and simulation results well verify the present disclosure.

Therefore, the principle and embodiments of the present disclosure are described in the above in conjunction with the drawings, while the present disclosure is not limited to the above embodiments, and the above embodiments are merely illustrative rather than restrictive. Under the guidance of the present disclosure, various improvements and variations made on this basis, including surface types of lenses, replacement, increase and decrease of materials, wave band changes, etc., all fall within the scope of protection of the present disclosure. The present disclosure does not elaborate the well-known technologies to those skilled in the art.

What is claimed is:

1. A metasurface-based ultra-wide-angle broadband polarization imaging system, wherein the system comprises, from an object side to an image side, a first lens having negative focal power, a linear polarizer, a quarter-wave plate, a diaphragm, a second lens having positive focal power, a third lens having positive focal power and a metasurface in sequence,
wherein object side surfaces and image side surfaces of the first lens, the second lens and the third lens are planar or spherical surfaces; and
the metasurface is composed of deep subwavelength structures, and a unit structure of the metasurface is a subwavelength silicon nanorod, wherein in the unit structure of the metasurface, an upper dielectric nanorod has a center-to-center spacing $p_M$ in a y direction and $0.1\lambda_0 < p_M < 0.6\lambda_0$, a spacing in an x direction being 100 nm, a width $w_M$ and $0.1\lambda_0 < w_M < 0.3\lambda_0$, and a height $h_M$ and $0.3\lambda_0 < h_M < 0.65\lambda_0$, where $\lambda_0$ is center wavelength; and a rotation angle of a unit structure of the metasurface is θ, and by providing unit structures with different rotation angles θ, a phase distribution required by the imaging system under a broadband spectrum is realized.

2. The metasurface-based ultra-wide-angle broadband polarization imaging system according to claim 1, wherein the linear polarizer and the quarter-wave plate are integrated, and can rotate together about an optical axis.

3. The metasurface-based ultra-wide-angle broadband polarization imaging system according to claim 1, wherein an image side surface of the first lens is a concave surface, an image side surface of the second lens is a convex surface, and an object side surface and an image side surface of the third lens are both convex surfaces.

4. The metasurface-based ultra-wide-angle broadband polarization imaging system according to claim 1, wherein in the imaging system, Nd1>1.5, Nd2>1.8, Nd3>1.8, Vd1-Vd2>17, and Vd1-Vd3>17, where Nd1 is a refractive index of the first lens, Nd2 is a refractive index of the second lens, Nd3 is a refractive index of the third lens, Vd1 is a dispersion coefficient of the first lens, Vd2 is a dispersion coefficient of the second lens, and Vd3 is a dispersion coefficient of the third lens.

5. The metasurface-based ultra-wide-angle broadband polarization imaging system according to claim 1, wherein the imaging system satisfies 30 mm<TTL<40 mm, 1<φ× BFL<4, where TTL is a total track length of the imaging system, p is focal power of the imaging system, and BFL is an optical back focal length of the imaging system.

6. The metasurface-based ultra-wide-angle broadband polarization imaging system according to claim 1, wherein the quarter-wave plate is of deep subwavelength structures, with a period p and $0.1\lambda_0 < p < 0.5\lambda_0$; a width of a unit structure of the quarter-wave plate is w and $0.05\lambda_0 < w < 0.2\lambda_0$; a height of the unit structure of the quarter-wave plate is h and $0.1\lambda_0 < h < \lambda_0$, and a base thickness is not more than 0.5 mm, where $\lambda_0$ is center wavelength.

7. The metasurface-based ultra-wide-angle broadband polarization imaging system according to claim 1, wherein the linear polarizer is of deep subwavelength structures, and a unit structure of the linear polarizer has a period range of $0.08\lambda_0 \sim 0.6\lambda_0$, a width range of $0.04\lambda_0 \sim 0.08\lambda_0$, and a height range of $0.08\lambda_0 \sim 0.5\lambda_0$, where $\lambda_0$ is center wavelength.

8. The metasurface-based ultra-wide-angle broadband polarization imaging system according to claim 1, wherein rotation of the linear polarizer and the quarter-wave plate is controlled by a miniature motor, and the miniature motor is remotely controlled.

9. A detection apparatus, wherein the detection apparatus is mounted with the imaging system according to claim 1.

* * * * *